United States Patent
Lim (10) Patent No.: US 11,656,348 B2
(45) Date of Patent: May 23, 2023

(54) DEVICE AND METHOD FOR ULTRA-WIDE BAND RANGING

(71) Applicant: HYUNDAI MOBIS CO., LTD., Seoul (KR)

(72) Inventor: Jongchul Lim, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 46 days.

(21) Appl. No.: 17/335,701

(22) Filed: Jun. 1, 2021

(65) Prior Publication Data

US 2021/0373142 A1 Dec. 2, 2021

(30) Foreign Application Priority Data

Jun. 2, 2020 (KR) .......... 10-2020-0066691

(51) Int. Cl.
*G01S 13/34* (2006.01)
*H04B 1/7163* (2011.01)
*H04L 43/106* (2022.01)

(52) U.S. Cl.
CPC .......... *G01S 13/343* (2013.01); *H04B 1/7163* (2013.01); *H04L 43/106* (2013.01); *H04B 2201/71634* (2013.01)

(58) Field of Classification Search
CPC .......... H04B 1/7163; H04B 2201/7134; H04L 43/106
See application file for complete search history.

(56) References Cited

U.S. PATENT DOCUMENTS

| 10,103,975 | B2 | 10/2018 | Richley et al. |
| 2018/0254925 | A1 | 9/2018 | Dutz et al. |
| 2018/0275268 | A1* | 9/2018 | Reisinger .............. H04L 7/0008 |
| 2020/0183000 | A1* | 6/2020 | Li ......................... H04W 4/023 |

FOREIGN PATENT DOCUMENTS

EP 3425867 A1 9/2019

OTHER PUBLICATIONS

LAN/MAN Standards Committee of the IEEE Computer Society; "P805.15.4zTM/D07 Draft Standard for Law-Rate Wireless Networks Amendment: Enhanced Ultra Wideband, (UWB) Physical Layers (PHYs) and Associated Ranging Techniques" IEEE Draft; P802.15.4Z-D7, IEEE-SA, Piscataway, NJ USA, vol. 802.15 EIR drafts; 802.15.4z drafts, No. D7 Mar. 18, 2020, pp. 1-185, XP068166229.
Bonafini Federico et al: "Exploiting Time Synchronization as Side Effect in UWB Real-Time Localization Devices" 2018 IEEE International Symposium on Precision Clock Synchronization for Measurement, Control, and Communication(ISPCS), IEEE, Sep. 30, 2018, pp. 1-6, XP033451150.

* cited by examiner

*Primary Examiner* — Elton Williams
(74) *Attorney, Agent, or Firm* — NovoTechIP International PLLC (57) ABSTRACT

The present invention relates to an ultra-wide band (UWB) ranging device and a UWB ranging method using the same. The UWB ranging device includes a memory in which a program for UWB ranging is stored, and a processor configured to execute the program, wherein the UWB ranging device performs the UWB ranging by transmitting an integrated packet that includes a Scrambled Timestamp Sequence (STS) and a payload.

2 Claims, 9 Drawing Sheets

DEVICE AND METHOD FOR ULTRA-WIDE BAND RANGING

CROSS-REFERENCE TO RELATED APPLICATION

This application claims priority to and the benefit of Korean Patent Application No. 10-2020-0066691, filed on Jun. 2, 2020, the disclosure of which is incorporated herein by reference in its entirety.

BACKGROUND

1. Field of the Invention

The present invention relates to an ultra-wide band (UWB) ranging device and a UWB ranging method using the same.

2. Discussion of Related Art

Ultra-wide band (UWB) technology is a technology for calculating a distance between communication entities by multiplying a signal arrival time between the communication entities by the speed of light using time of flight (ToF) technology.

According to the related art, since a frame for data communication is distinguished from a frame to which a Scrambled Timestamp Sequence (STS) for affixing a timestamp is added, there is a problem in that an unnecessary frame is transmitted.

SUMMARY OF THE INVENTION

The present invention is directed to providing an ultra-wide band (UWB) ranging device in which a frame for data communication is integrated with a frame to which a Scrambled Timestamp Sequence (STS) for affixing a timestamp is added, thereby increasing the efficiency of UWB ranging, and a UWB ranging method using the same.

A UWB ranging device according to the present invention includes a memory in which a program for UWB ranging is stored, and a processor configured to execute the program, wherein the processor performs the UWB ranging by transmitting an integrated packet that includes an STS and a payload.

The processor may transmit a poll and a final patch which include the integrated packet.

The processor may calculate an error of a transmission time based on an actual poll transmission time and may estimate a final transmission time based on the error.

When antenna diversity is applied or when ranging is repeatedly performed, the processor may calculate an average of errors in transmission times in previous stages and may estimate the final transmission time based on the average.

A UWB ranging method according to the present invention includes operation (a) of transmitting a poll that includes an STS and a payload, operation (b) of estimating a final transmission time, and operation (c) of transmitting a final patch, which includes an STS and a payload, by using an estimation result in operation (b).

In operation (a), the poll may be transmitted to an anchor by integrating a frame for data communication with a frame to which the STS for affixing a timestamp is added.

In operation (b), an error of a transmission time may be calculated based on an actual poll transmission time, and the final transmission time may be estimated by applying the error.

In operation (b), when antenna diversity is applied or when ranging is repeatedly performed, an average of errors in transmission times in previous stages may be calculated, and the final transmission time may be estimated based on the average.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above objects and other objects, advantages and features of the present invention and methods for accomplishing the same will be more clearly understood from embodiments to be described in detail below with reference to the accompanying drawings.

However, the present invention is not limited to the following embodiments but may be implemented in various different forms. Rather, these embodiments are provided only to complete the disclosure of the present invention and to allow those skilled in the art to understand the category of the present invention. The present invention is defined by the category of the claims.

Meanwhile, terms used in this specification are to describe the embodiments and are not intended to limit the present invention. As used herein, singular expressions, unless defined otherwise in context, include plural expressions. It will be further understood that the terms "comprises," "comprising," "includes," and/or "including," if used herein, specify the presence of stated components, steps, operations, and/or elements but do not preclude the presence or addition of one or more other components, steps, operations, and/or elements.

In order to provide a local-based service (LBS), technologies such as a global positioning system (GPS), Wi-Fi, and Bluetooth are used. The technologies have a problem that it is difficult to perform accurate measurement, but ultra-wide band (UWB) technology (in the band range of 6 GHz to 8 GHz and a bandwidth of 500 MHz or more) has an advantage in that positioning is possible with high accuracy within about several dozens of centimeters in a wide frequency band through low power communication.

GPS-based and mobile communication network-based position tracking technologies according to the related art have an error range of 5 m to 50 m and an error range of 50 m to 200 m, respectively, and in the case of a GPS, the arrival of signals transmitted from satellites may be interrupted in an urban building forest.

In the case of Wi-Fi, position tracking is possible at low cost, but since a used frequency band is narrow, when the number of subjects to be position-tracked is increased, there may be a limitation in channel division. In addition, a mobile terminal may be disconnected from a fixed Wi-Fi access point (AP).

In the case of Bluetooth, although a plurality of sensors may be disposed at low cost, Bluetooth is not suitable for real time position tracking in a dynamic environment due to high communication latency thereof.

UWB technology is technology for calculating a distance between communication entities by multiplying a signal arrival time between the communication entities by the speed of light using time of flight (ToF) technology in the band range of 6 GHz to 8 GHz and a bandwidth of 500 MHz or more.

Unlike Wi-Fi and Bluetooth, in the case of a UWB, a wide frequency band is used, and it is possible to transmit a large amount of information through a high transmission rate with low power.

Positioning using UWB technology has advantages of having a low error rate of about 20 cm, having high transmittance with respect to obstacles, and not being affected by other signals of Wi-Fi or the like.

Ranging refers to an action of measuring a distance between one device (fob) and one anchor, and a data structure conforms to the IEEE802.15.4z standard, and about 200 μs is taken to transmit one packet.

A slot is defined as a time taken until a fob or anchor transmits (or receives) a signal a following time after transmitting (or receiving) a signal once.

Figure 1:
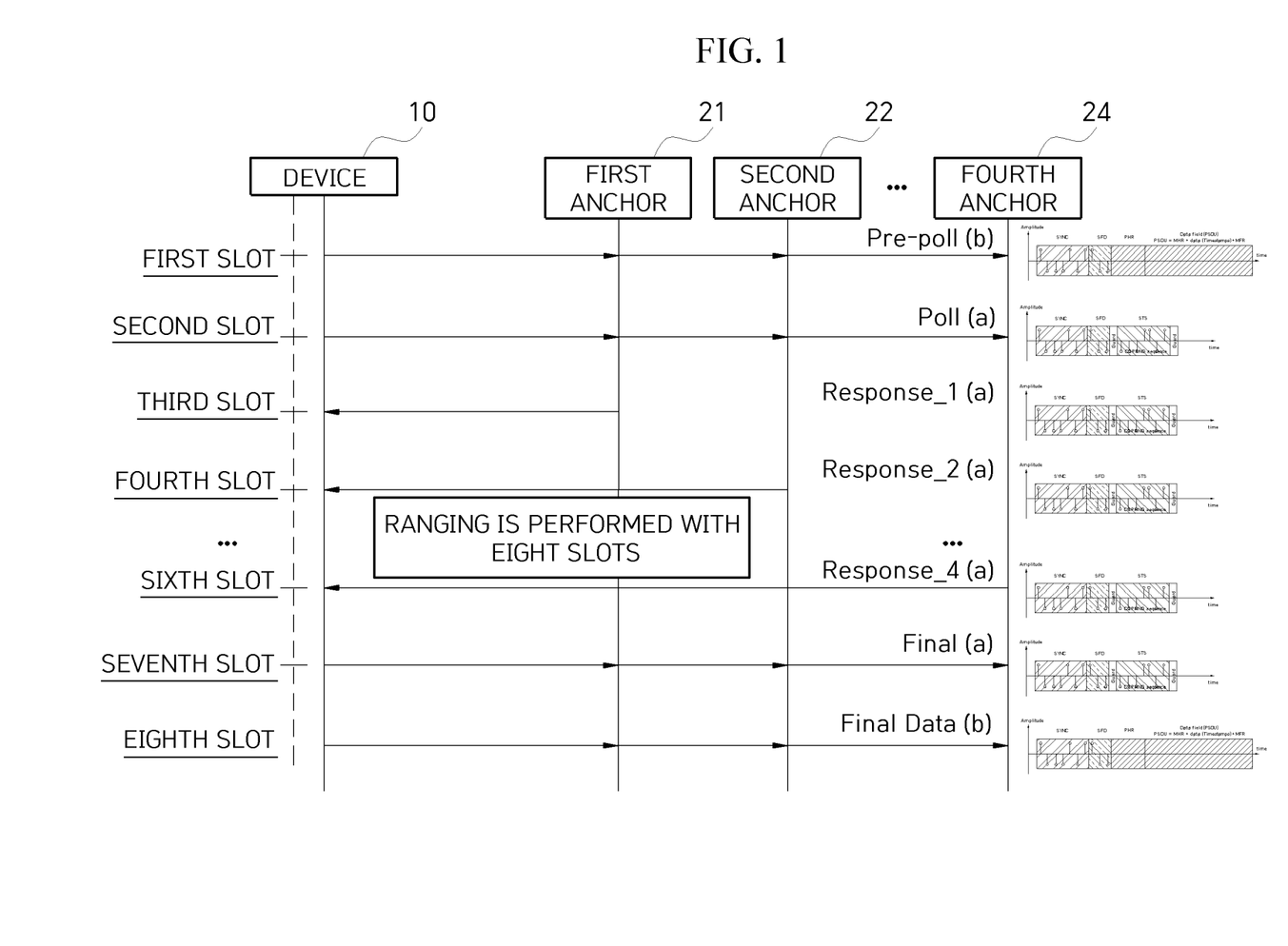
FIG. 1 illustrates ultra-wide band (UWB) ranging according to the related art.

FIG. 1 illustrates UWB ranging according to the related art and illustrates a ranging sequence based on four anchors.

A device 10 transmits a pre-poll to first to fourth anchors 21 to 24 in a first slot, and in this case, the device 10 uses a frame format which has a structure including a payload without a Scrambled Timestamp Sequence (STS) so as to transmit data such as a timestamp.

The device 10 transmits a poll to the first to fourth anchors 21 to 24 in a second slot, and in this case, the device 10 uses a frame format including an STS so as to affix a timestamp.

The first to fourth anchors 21 to 24 transmit responses to the device 10 in third to sixth slots, and the device 10 transmits a final packet to the first to fourth anchors 21 to 24 in a seventh slot.

The device 10 transmits final data to the first to fourth anchors 21 to 24 in an eighth slot, and in this case, as in the pre-poll, the device 10 uses a frame format which has a structure including a payload without an STS so as to transmit data.

According to the above-described related art, since a frame for data communication is distinguished from a frame to which an STS for affixing a timestamp is added, there is a problem in that an unnecessary frame is transmitted.

Figure 2:
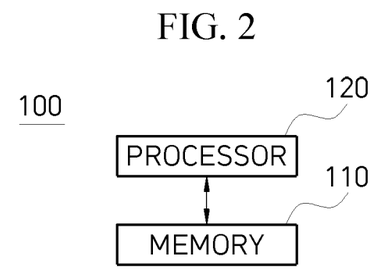
FIG. 2 illustrates a UWB ranging device according to an embodiment of the present invention.

FIG. 2 illustrates a UWB ranging device according to an embodiment of the present invention.

A UWB ranging device 100 according to the present invention includes a memory 110, a processor 120, and/or the like. The memory 110 may be any computer-readable medium in communication with the processor 120 and store instructions that, when executed by the processor 120, cause the processor 120 to control the UWB ranging device 100 to perform one or more operations related to UWB ranging.

The UWB ranging device 100 transmits an integrated packet including an STS and a payload to perform UWB ranging.

The UWB ranging device 100 transmits a poll and a final packet which include a packet in which a frame for data communication is integrated with a frame to which an STS for affixing a timestamp is added.

The UWB ranging device 100 calculates an error of a transmission time based on an actual poll transmission time, estimates a final transmission time based on the error, and transmits a final packet including the estimated final transmission time.

When antenna diversity is applied or when ranging is repeatedly performed, the UWB ranging device 100 calculates an average of errors in transmission times in previous stages, estimates a final transmission time based on the average, and transmits a final packet including the estimated final transmission time.

Figure 3A:
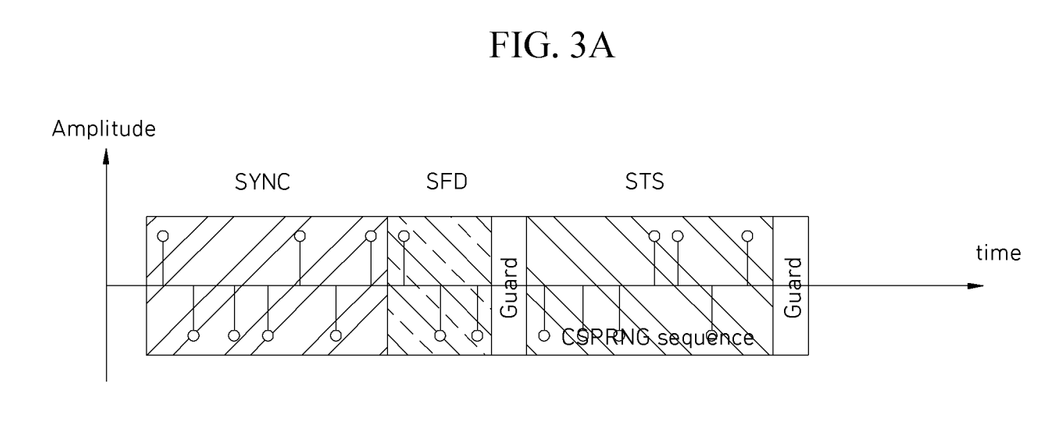
FIG. 3A through FIG. 3C show frame formats according to embodiments of the present invention.
Figure 3B:
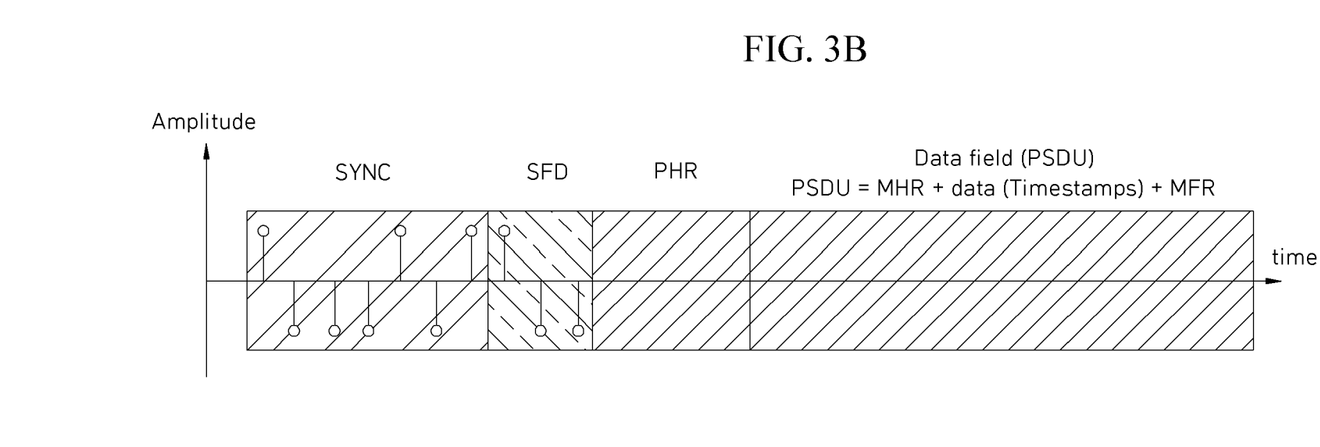
Figure 3C:
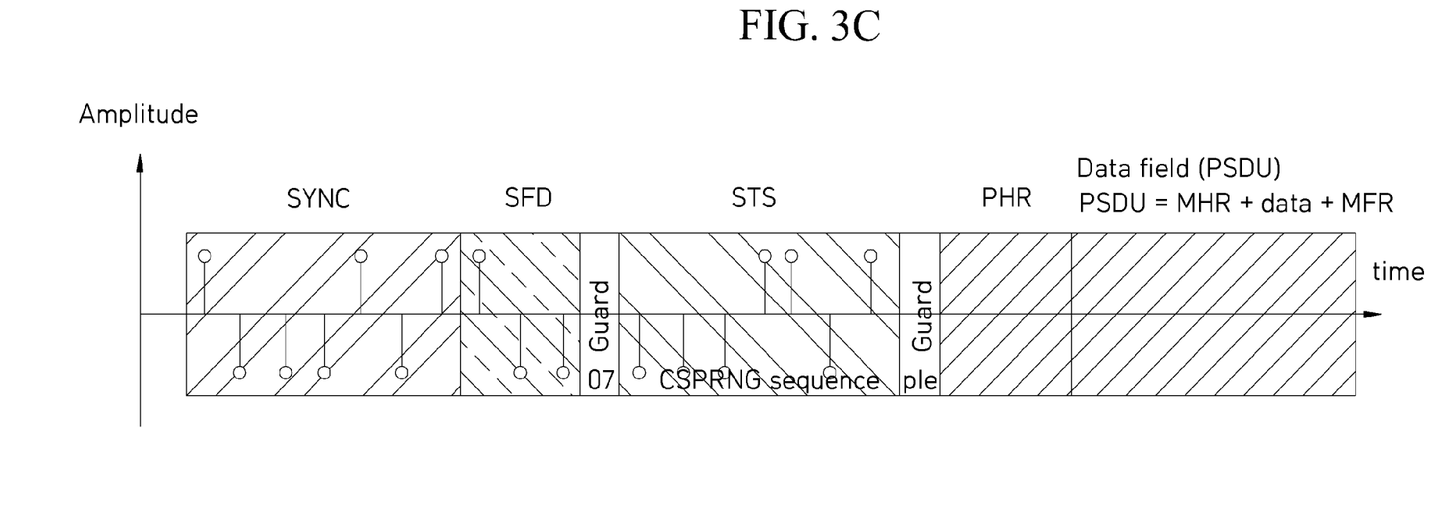

FIG. 3A and through FIG. 3C show frame formats according to embodiments of the present invention.

FIG. 3A shows a frame format including an STS for affixing a timestamp, FIG. 3B shows a frame format having structure including a payload without an STS so as to transmit data such as a timestamp, and FIG. 3C shows a structure capable of affixing a timestamp and also transmitting data.

Figure 4:
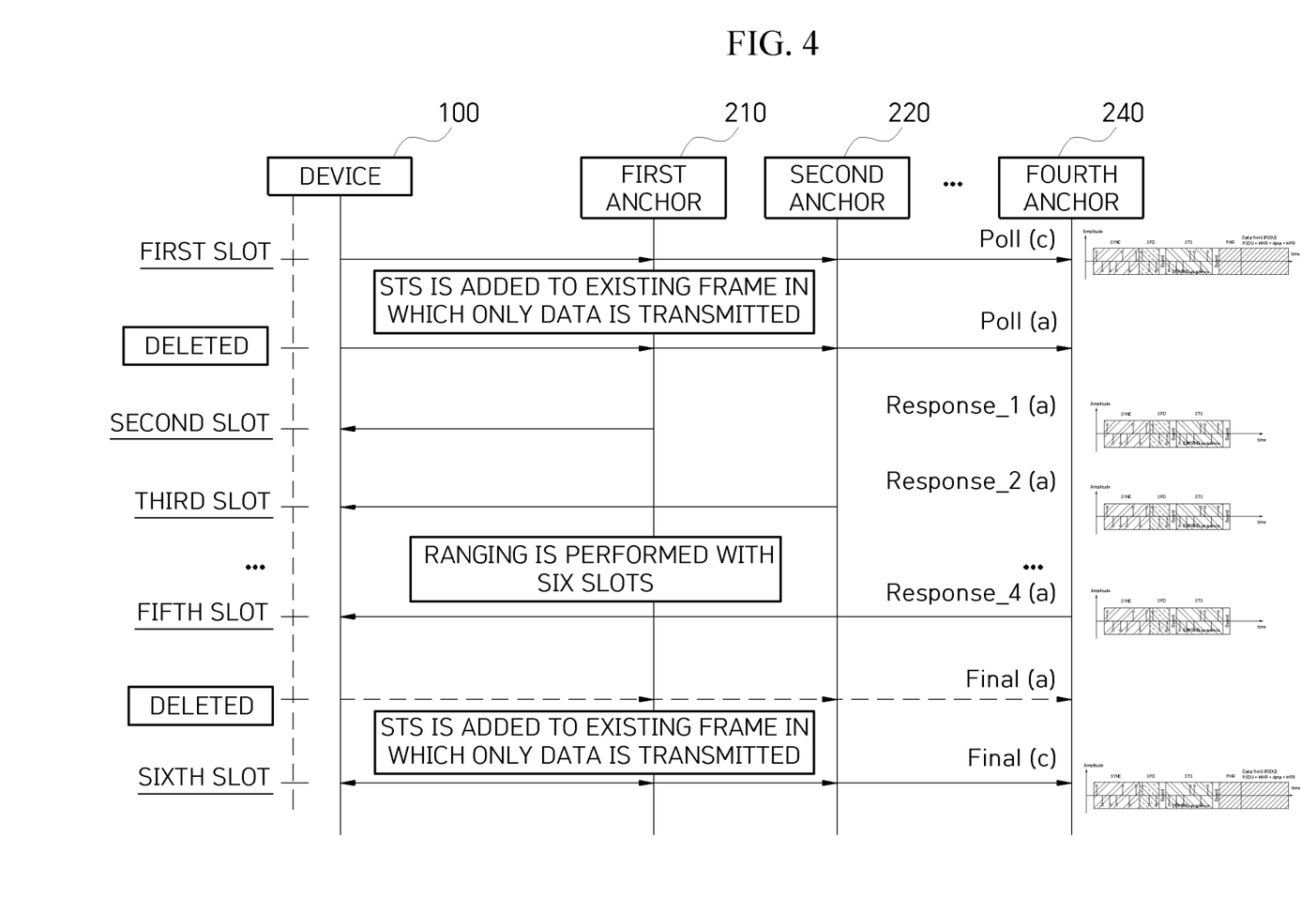
FIG. 4 illustrates UWB ranging according to an embodiment of the present invention.

FIG. 4 illustrates UWB ranging according to an embodiment of the present invention.

When a poll is to be transmitted, a device 100 according to an embodiment of the present invention transmits the poll to first to fourth anchors 210 to 240 by using a structure capable of affixing a timestamp and also transmitting data, that is, by integrating a frame for data communication with a frame to which an STS for affixing a timestamp is added.

In second to fifth slots, the first to fourth anchors 210 to 240 transmit responses to the device 100, and in this case, a frame format, which has a structure including an STS for affixing a timestamp, is used.

In a sixth slot, when a final packet is to be transmitted, similar to the poll, the device 100 transmits the final packet to the first to fourth anchors 210 to 240 by integrating a frame for data communication with a frame to which an STS for affixing a timestamp is added.

As compared with that shown in FIG. 1, according to the embodiment of the present invention, ranging is performed with six slots, thereby reducing the number of the slots to achieve power optimization and to increase the efficiency of UWB ranging.

According to the embodiment of the present invention, when a time (timestamp), at which a corresponding signal is transmitted, is included in a last slot (sixth slot of FIG. 4), an STS is included by estimating a transmission time of the last slot.

That is, a transmission time of a last slot is estimated by using a transmission error that occurs when the device 100 transmits a poll. This is because, since an error of a transmission time is mostly caused by a manufacturing error in a UWB module unit and an oscillator error according to an environment (temperature/humidity), and a transmission time between a poll and a final patch is only several milliseconds (ms), it is possible to assume that environments of the poll and the final patch are substantially the same (on the other hand, since a response reception time includes a ToF, it cannot be useful).

Figure 5:
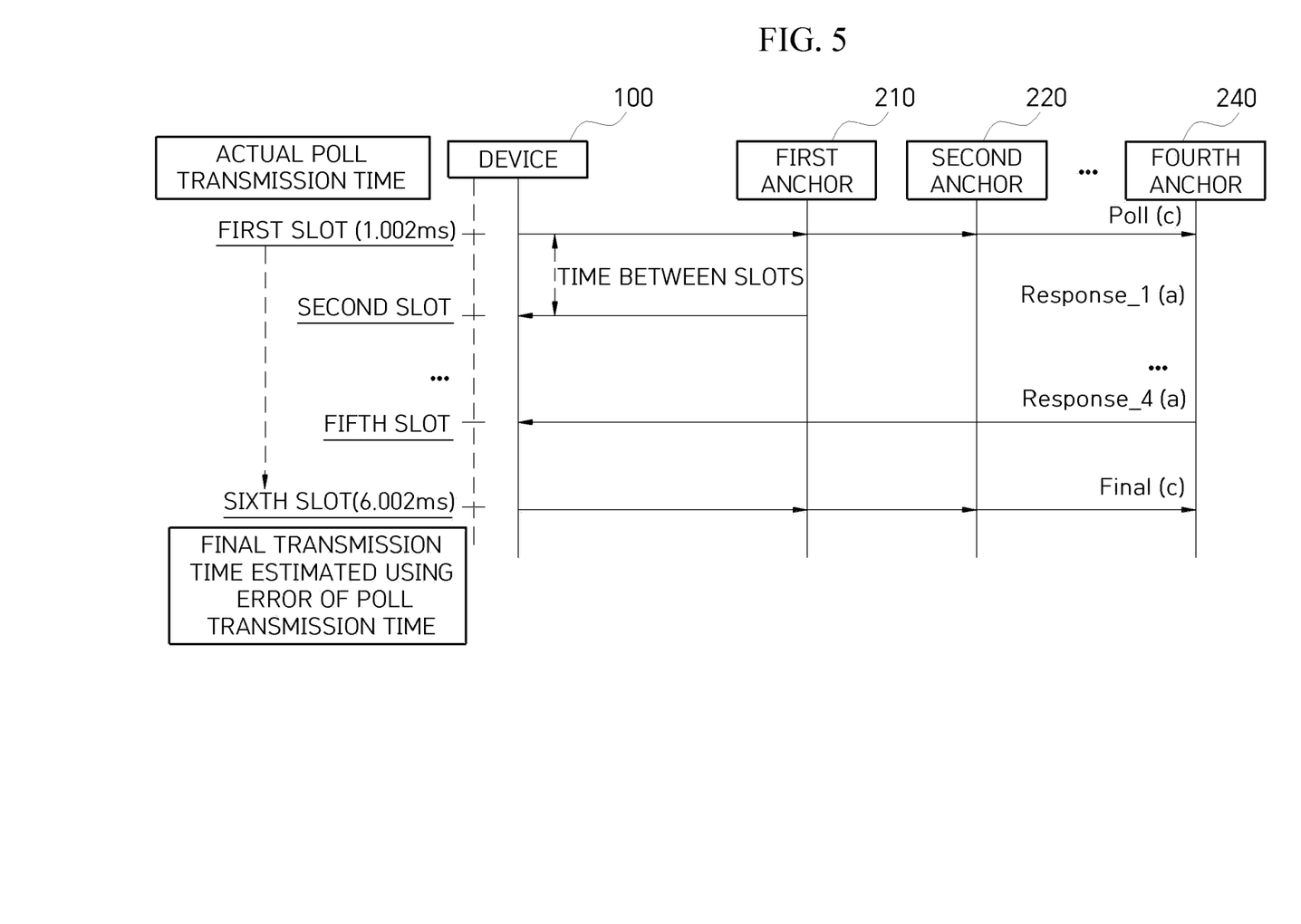
FIGS. 5 and 6 illustrate the estimation of a final transmission time according to embodiments of the present invention.
Figure 6:
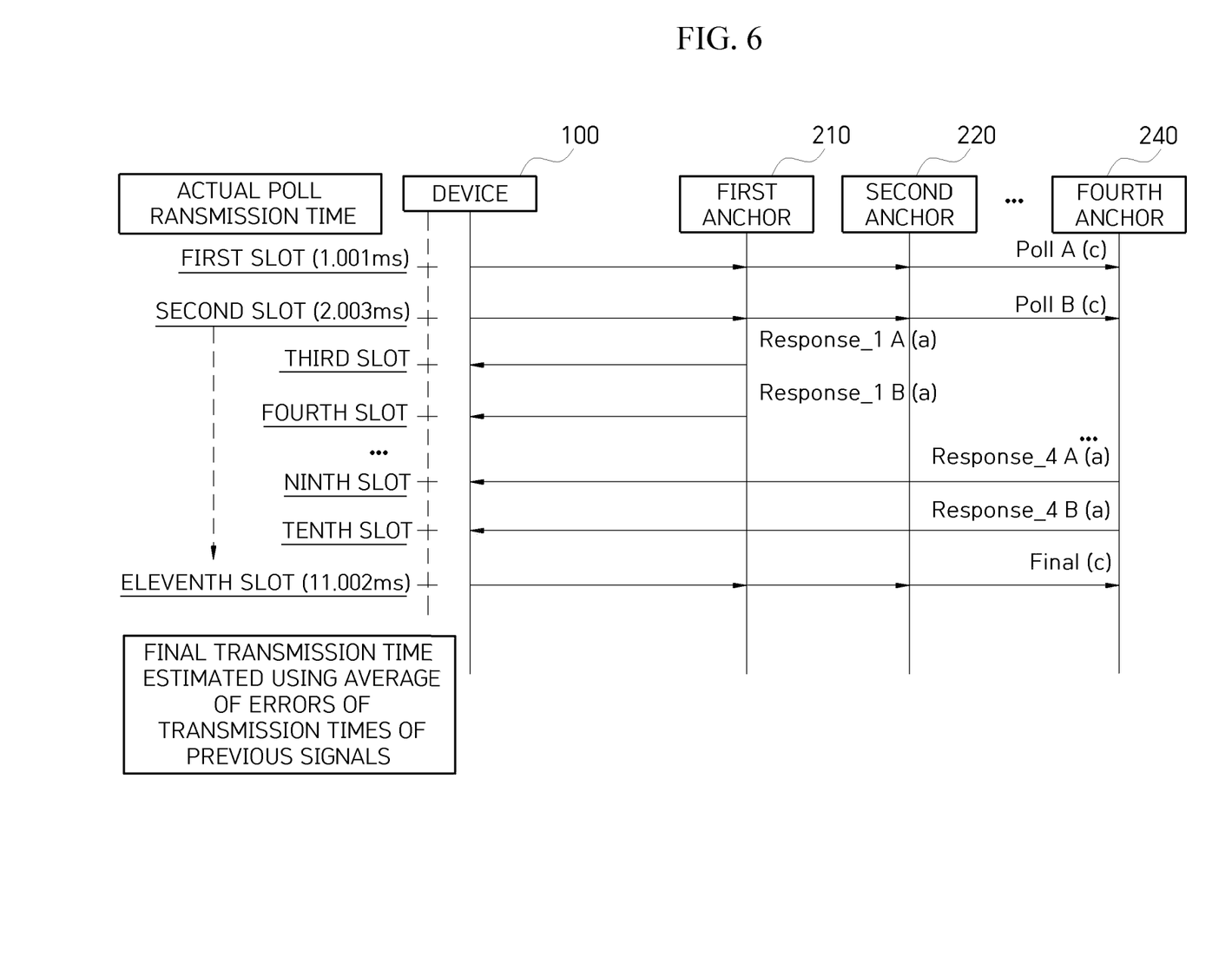

FIGS. 5 and 6 illustrate the estimation of a final transmission time according to embodiments of the present invention.

Referring to FIG. 5, a time between slots is variable but is assumed to be one ms.

When an actual poll transmission time in a first slot is 1.002 ms, a device 100 estimates a final transmission time using an error of a poll transmission time to estimate a transmission time in a sixth slot as 6.002 ms.

Referring to FIG. 6, when the same signal is transmitted several times, such as when antenna diversity is applied, or when ranging is continuously repeated, a parameter is increased, and thus, it is possible to estimate a more accurate final transmission time by using an average of errors in actual transmission times.

That is, when an actual first poll transmission time of a first slot is 1.001 ms and an actual second poll transmission time of a second slot is 2.003 ms, an average of errors is 0.002 ms, and a final transmission time of an eleventh slot is estimated as 11.002 ms based on an average of errors in transmission times of previous signals.

Figure 7:
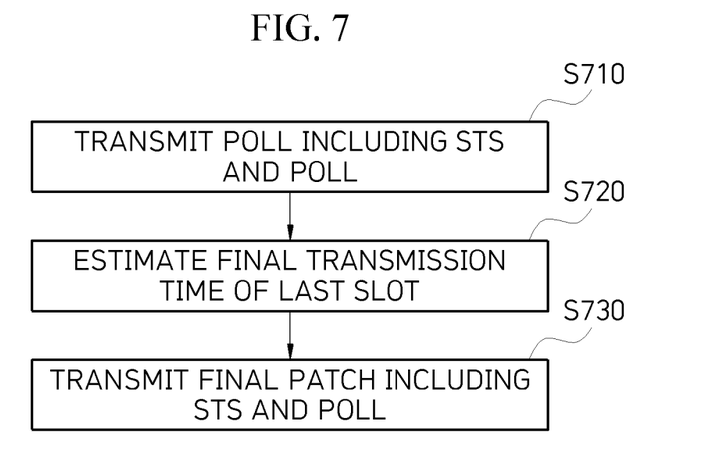
FIG. 7 illustrates a UWB ranging method according to an embodiment of the present invention.

FIG. 7 illustrates a UWB ranging method according to an embodiment of the present invention.

The UWB ranging method according to the embodiment of the present invention includes transmitting a poll that includes an STS and a payload (S710), estimating a final transmission time of a last slot (S720), and transmitting a final patch including an STS and a payload using an estimation result (S730).

In operation S710, the poll is transmitted to an anchor by integrating a frame for data communication with a frame to which an STS for affixing a timestamp is added.

In operation S720, an error of a transmission time is calculated based on an actual poll transmission time in a first slot, and the final transmission time is estimated by applying the error.

In operation S720, when antenna diversity is applied or when ranging is repeated, an average of errors in transmission times in previous stages is calculated, and the final transmission time is estimated based on the average.

In operation S730, by using an estimation result, the final patch is transmitted to an anchor by integrating a frame for data communication with a frame to which an STS for affixing a timestamp is added.

According to embodiments of the present invention, as compared with a UWB ranging operation according to the related art, transmission/reception is performed by integrating a frame for data communication with a frame for affixing a timestamp, thereby reducing the number of slots to achieve power optimization and to increase the efficiency of UWB ranging.

The effects of the present invention are not limited to the aforesaid, but other effects not described herein will be clearly understood by those skilled in the art from descriptions below.

Meanwhile, the UWB ranging method according to the embodiment of the present invention may be implemented in a computer system or recorded in a recording medium. The computer system may include at least one processor, a memory, a user input device, a data communication bus, a user output device, and a storage. Each of the above-described components performs data communication through the data communication bus.

The computer system may further include a network interface coupled to a network. The processor may be a central processing unit (CPU) or a semiconductor device processing a command stored in the memory and/or the storage.

The memory and the storage may include various types of volatile or nonvolatile storage mediums. For example, the memory may include a read-only memory (ROM) and a random-access memory (RAM).

Therefore, the UWB ranging method according to the embodiment of the present invention may be implemented as a computer-executable method. When the UWB ranging method according to the embodiment of the present invention is executed in a computer device, computer-readable commands may perform the ranging method according to the present invention.

Meanwhile, the above-described UWB ranging method according to the present invention may also be embodied as computer-readable codes on a computer-readable recording medium. The computer-readable recording medium includes any type of recording media in which data that can be read by a computer system is stored. Examples of the computer-readable recording media include a ROM, a RAM, a magnetic tape, a magnetic disc, a flash memory, an optical data storage device, and the like. In addition, the computer-readable recording medium may also be distributed over network coupled computer systems so that the computer-readable code may be stored and executed in a distributed fashion.

So far, the present invention has been described with reference to embodiments thereof. It should be understood by those skilled in the art that various changes in form and details may be made herein without departing from the spirit and scope of the present invention. Therefore, the disclosed embodiments should be considered in a descriptive sense only and not for purposes of limitation. Also, the scope of the present invention is defined not by the detailed description of embodiments but by the appended claims, and all differences within the scope thereof should be construed as being included in the present invention.

What is claimed is:

1. An ultra-wide band (UWB) ranging device comprising:
a processor; and
a computer-readable medium in communication with the processor and storing instructions that, when executed by the processor, cause the processor to control the UWB ranging device to perform:
   transmitting an integrated packet including a Scrambled Timestamp Sequence (STS) and a payload;
   calculating, based on an actual poll transmission time, an error in a transmission time;
   estimating, based on the calculated error, the final transmission time; and
   transmitting a poll and a final patch, the final patch including the integrated packet,
wherein, for calculating the error in the transmission time, the instructions, when executed by the processor, further cause the processor to control the UWB ranging device to perform:
   determining that antenna diversity has been applied in previous stages; and
   calculating an average of a plurality of errors in a plurality of transmission times in the previous stages, and
wherein, for estimating the final transmission time, the instructions, when executed by the processor, further cause the processor to control the UWB ranging device to perform estimating, based on the calculated average of the plurality of errors, the final transmission time.

2. A method of performing an ultra-wide band (UWB) ranging comprising:

transmitting an integrated packet including a Scrambled Timestamp Sequence(STS) and a payload;
calculating, based on an actual poll transmission time, an error in a transmission time;
estimating, based on the calculated error, the final transmission time; and
transmitting a poll and a final patch, the final patch including the integrated packet,
wherein calculating the error in the transmission time comprises:
   determining that antenna diversity has been applied in previous stages; and
   calculating an average of a plurality of errors in a plurality of transmission times in the previous stages, and
wherein estimating the final transmission time comprises estimating, based on the calculated average of the plurality of errors, the final transmission time.

* * * * *